(12) United States Patent
Garg et al.

(10) Patent No.: US 8,949,522 B1
(45) Date of Patent: Feb. 3, 2015

(54) PERFORMANCE OF A STRIDE-BASED PREFETCHER ON AN OUT-OF-ORDER PROCESSING UNIT (CPU)

(75) Inventors: Gaurav Garg, San Jose, CA (US); David T. Hass, Santa Clara, CA (US)

(73) Assignee: Netlogic Microsystems, Inc., Santa Clara, CA (US)

( * ) Notice: Subject to any disclaimer, the term of this patent is extended or adjusted under 35 U.S.C. 154(b) by 870 days.

(21) Appl. No.: 13/165,736

(22) Filed: Jun. 21, 2011

(51) Int. Cl.
*G06F 13/00* (2006.01)

(52) U.S. Cl.
USPC ............... 711/113; 711/137; 711/E12.067; 711/E12.078

(58) Field of Classification Search
None
See application file for complete search history.

(56) References Cited

U.S. PATENT DOCUMENTS

| | | | | |
|---|---|---|---|---|
| 6,055,622 | A * | 4/2000 | Spillinger | 712/207 |
| 6,401,187 | B1 * | 6/2002 | Motokawa et al. | 711/213 |
| 6,976,147 | B1 * | 12/2005 | Isaac et al. | 711/205 |
| 7,664,922 | B2 * | 2/2010 | Ohtsuka et al. | 711/158 |
| 2002/0087802 | A1 * | 7/2002 | Al-Dajani et al. | 711/137 |
| 2010/0138587 | A1 * | 6/2010 | Hutson | 711/5 |
| 2010/0153653 | A1 * | 6/2010 | El-Mahdy et al. | 711/137 |
| 2010/0268894 | A1 * | 10/2010 | Kadambi et al. | 711/137 |
| 2011/0264864 | A1 * | 10/2011 | Kadambi et al. | 711/137 |
| 2014/0006718 | A1 * | 1/2014 | Ramani-Augustin et al. | 711/137 |
| 2014/0208018 | A1 * | 7/2014 | Benhase et al. | 711/113 |
| 2014/0208020 | A1 * | 7/2014 | Benhase et al. | 711/113 |
| 2014/0208021 | A1 * | 7/2014 | Benhase et al. | 711/113 |

* cited by examiner

*Primary Examiner* — Sean D Rossiter
(74) *Attorney, Agent, or Firm* — Sterne, Kessler, Goldstein & Fox P.L.L.C.

(57) ABSTRACT

Systems, apparatusses, and methods are disclosed for improving performance of a stride-based prefetcher on an out-of-order central processing unit (CPU). The present disclosure teaches a processor system that employs out-of-order stride prefetch units. The out-of-order stride prefetch units are utilized for issuing prefetches for out-of-order stride access patterns. In one or more embodiments, the out-of-order stride prefetch units examine the offsets between past virtual address (VA) accesses and the directions of the past VA accesses in order to generate an estimate of the underlying VA access stride of the executed program code (PC). In at least one embodiment, the out-of-order stride prefetch units use the estimate of the VA access stride in order to generate a prediction of future VA accesses. In some embodiments, after the out-of-order stride prefetch units have generated the prediction of future VA accesses, the out-of-order stride prefetch units prefetch the predicted future VA accesses.

26 Claims, 12 Drawing Sheets

| iteration | VA | VA+1 | VA+2 | VA+3 | VA+4 | VA+5 | VA6+6 | VA+7 | VA+8 |
|---|---|---|---|---|---|---|---|---|---|
| 0 | L1 | | | | | | | | |
| 1 | | L1 | L2 | | | | | | |
| 2 | | | L1 | L2 | | | | | |
| 3 | | | | L1 | L2 | | | | |
| 4 | | | | | L1 | L2 | | | |
| 5 | | | | | | L1 | L2 | L2 | L2 |

FIG. 2

| Ld Stride | Wt Stride | Wt VA | Next State |
|---|---|---|---|
| Rd Stride | Ld Stride | Ld VA | Steady |
| Rd Stride x 2 | Rd Stride | Rd VA | Steady |
| Rd Stride x 4 | Rd Stride | Rd VA | Steady |
| Rd Stride/2 | Ld Stride | Ld VA | Steady |
| Rd Stride/4 | Ld Stride | Ld VA | Steady |
| -Rd Stride x 2 | -Rd Stride | Rd VA | Steady |
| -Rd Stride x 4 | -Rd Stride | Rd VA | Steady |
| -Rd Stride/2 | -Ld Stride | Rd VA | Steady |
| -Rd Stride/4 | -Ld Stride | Rd VA | Steady |
| Not Equal | Ld Stride | Ld VA | Search/Transient |

FIG. 4    Stride Prediction Table    400

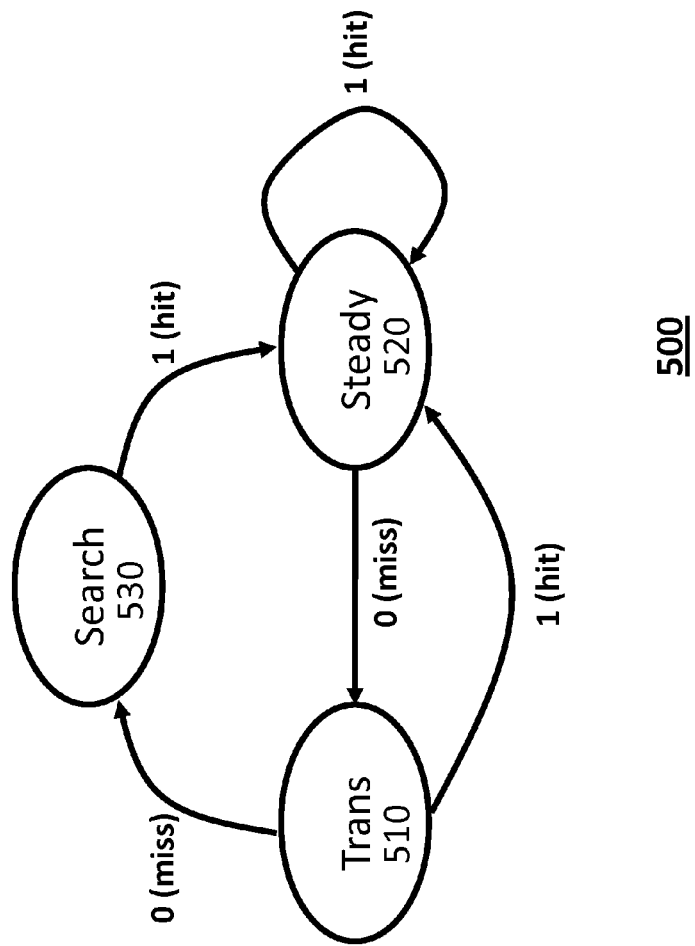
FIG. 5    Stride Prediction State Transition Diagram

| Iteration | Match? | PC | VA | Stride | State | Prefetch? |
|---|---|---|---|---|---|---|
| 0 | | 100 | 0 | init | search | No |
| 1 | Not Equal | 100 | 8 | 8 | search | No |
| 2 | -Rd Stride/2 | 100 | 8 | 4 | steady | VA 12 |
| 3 | Rd Stride | 100 | 12 | 4 | steady | VA 16 |
| 4 | Rd Stride*2 | 100 | 12 | 4 | steady | VA 16 |
| 5 | Rd Stride | 100 | 16 | 4 | steady | VA 20 |
| 6 | Rd Stride*2 | 100 | 16 | 4 | steady | VA 20 |
| 7 | Rd Stride*4 | 100 | 16 | 4 | steady | VA 20 |
| 8 | Not Equal | 100 | 28 | 12 | transient | No |
| 9 | Not Equal | 100 | 36 | 8 | search | No |
| 10 | Rd Stride | 100 | 44 | 8 | steady | VA 52 |

FIG. 8B

| Iteration | Apply Matching Algorithm | Hit or Miss | Match |
|---|---|---|---|
| 0 | | | |
| 1 | 8 is an element of {0} | Load Miss | Not Equal |
| 2 | -4 is an element of {8, 16, 32, 4, 2, -16, -32, -4, -2} | Load Hit | -Rd Stride/2 |
| 3 | 4 is an element of {4, 8, 16, 2, 1, -8, -16, -2, -1} | Load Hit | Rd Stride |
| 4 | 8 is an element of {4, 8, 16, 2, 1, -8, -16, -2, -1} | Load Hit | Rd Stride*2 |
| 5 | 4 is an element of {4, 8, 16, 2, 1, -8, -16, -2, -1} | Load Hit | Rd Stride |
| 6 | 8 is an element of {4, 8, 16, 2, 1, -8, -16, -2, -1} | Load Hit | Rd Stride*2 |
| 7 | 16 is an element of {4, 8, 16, 2, 1, -8, -16, -2, -1} | Load Hit | Rd Stride*4 |
| 8 | 12 is an element of {4, 8, 16, 2, 1, -8, -16, -2, -1} | Load Miss | Not Equal |
| 9 | 8 is an element of {12, 24, 48, 6, 3, -24, -48, -6, -3} | Load Miss | Not Equal |
| 10 | 8 is an element of {8, 16, 32, 4, 2, -16, -32, -4, -2} | Load Hit | Rd Stride |

FIG. 8C

PERFORMANCE OF A STRIDE-BASED PREFETCHER ON AN OUT-OF-ORDER PROCESSING UNIT (CPU)

BACKGROUND

The present disclosure relates to improving performance of a stride-based prefetcher. In particular, it relates to improving performance of a stride-based prefetcher on an out-of-order central processing unit (CPU).

Over the past decade, the increase in processor frequency has not been matched by a corresponding reduction in memory access latency. This mismatch in performance has led to processors being frequently stalled when there is a delay in data arriving to the processor from memory. This delay limits or negates the improvement achieved from the increase in processor frequency. To deal with this problem, processors have incorporated multi-levels of caches. The multi-level caches allow for frequently accessed data to be fetched quickly by the processors. However, the processors still incur a huge latency penalty the first time they reference data that is not present in one of their caches.

Current processor systems address this problem by incorporating prefetch units in the processor pipeline. These prefetch units exploit the spatial and temporal locality of the processor accesses to predict which addresses are likely to be accessed next. The prefetch units generate their address predictions by examining the addresses which were accessed in the recent past. A common prefetcher implementation tracks the difference in successive addresses (i.e. the stride) that were accessed in the recent past. If the stride is constant, then the prefetcher issues multiple addresses spaced out by successive multiples of the stride starting from the last address. For example, if the past virtual address (VA) accesses were in the order: VA-3*Stride, VA-2*Stride, VA-Stride, VA; then the prefetcher will prefetch the following addresses: VA+Stride, VA+2*Stride, VA+3*Stride. This type of prefetcher is very effective for situations where large data structures (e.g., data structures in the form of an array or a matrix) are being accessed in regular loops.

However, current, conventional stride-based prefetchers do not function well in situations where the processor accesses are not in a strict, numeric sequence. This situation arises frequently in modern out-of-order processors. Specifically, this situation occurs especially often when the out-of-order processors perform applications where a data structure is accessed in a tight loop where very little computation is done before issuing the next access, such as with the execution of a block-transfer application.

Accordingly, there is a need for a system that generates an estimate of the correct access stride from out-of-order accesses.

SUMMARY

The present disclosure relates to a systems, apparatusses, and methods for improving performance of a stride-based prefetcher on an out-of-order central processing unit (CPU). The disclosed system for improving performance of a stride-based prefetcher on an out-of-order CPU involves at least one processor, a plurality of caches, and at least one out-of-order stride prefetch unit. In one or more embodiments, at least one processor executes program code (PC). In some embodiments, each processor has at least one associated cache. In at least one embodiment, each processor has at least one associated out-of-order stride prefetch unit. In one or more embodiments, at least one out-of-order stride prefetch unit is utilized for issuing prefetches for out-of-order stride access patterns.

In some embodiments, at least one out-of-order stride prefetch unit examines the offsets between past virtual address (VA) accesses and the directions of the past VA accesses in order to generate an estimate of the VA access stride of the executed PC. In at least one embodiment, at least one out-of-order stride prefetch unit uses the estimate of the VA access stride in order to generate a prediction of future VA accesses. In one or more embodiments, at least one out-of-order stride prefetch unit prefetches the predicted future VA accesses.

In one or more embodiments, at least one out-of-order stride prefetch unit tracks (e.g., always tracks) the past VA accesses in a constant direction of the executed PC. In at least one embodiment, at least one out-of-order stride prefetch unit stores (e.g., always stores) the smallest estimated VA access stride. In some embodiments, the plurality of caches are caches of multi-levels. In one or more embodiments, the disclosed system further involves at least one stream prefetch unit. In some embodiments, each processor of the disclosed system has at least one associated stream prefetch unit. In at least one embodiment, at least one stream prefetch unit is utilized for issuing prefetches for stream access patterns.

In some embodiments, a method for improving performance of a stride-based prefetcher on an out-of-order CPU involves providing at least one processor and executing, with at least one processor, PC. The method further involves providing a plurality of caches, and associating each processor with at least one cache. Further, the method involves providing at least one out-of-order stride prefetch unit, and associating each processor with at least one out-of-order stride prefetch unit. The method also involves issuing prefetches, with at least one out-of-order stride prefetch unit, for out-of-order stride patterns.

In one or more embodiments, the disclosed method further involves examining, with at least one out-of-order stride prefetch unit, the offsets between past VA accesses and the directions of the past VA accesses in order to generate an estimate of the VA access stride of the executed PC. In some embodiments, the method also involves generating, with at least one out-of-order stride prefetch unit, a prediction of future VA accesses by using the estimate of the VA access stride. In addition, in at least one embodiment, the method involves prefetching, with at least one out-of-order stride prefetch unit, the predicted future VA accesses.

In some embodiments, the method of the present disclosure further involves tracking, with at least one out-of-order stride prefetch unit, the past VA accesses in a constant direction of the executed PC. In one or more embodiments, the method also involves storing, with at least one out-of-order stride prefetch unit, the smallest estimated VA access stride. In at least one embodiment, the plurality of caches of the disclosed method are caches of multi-levels. In some embodiments, the method further involves providing at least one stream prefetch unit, and associating each processor with at least one stream prefetch unit. In addition, the method involves issuing prefetches, with at least one stream prefetch unit, for stream access patterns.

In one or more embodiments, a method for improving performance of a stride-based prefetcher on an out-of-order CPU involves the following steps a.) through i.). For step a.), the method involves loading a virtual address (Ld VA) from a CPU PC instruction. Also, for step b.), the method involves determining whether there is an entry for the PC in a Stride Queue (StrideQ) table. In addition, for step c.), if there is no entry for the PC in the StrideQ table, the method involves creating an initialization StrideQ table entry for the PC, and repeating steps a.) and b.).

For step d.), if there is an entry for the PC in the StrideQ table, the method involves computing a load stride (Ld Stride). Also, for step e.), the method involves applying a matching algorithm using the Ld Stride and a read stride (Rd Stride). In addition, for step f.), the method involves updating the StrideQ table according to the matching algorithm results. For step g.), the method involves determining whether the State field in the StrideQ table is set to steady. Additionally, for step h.), if the State field in the StrideQ table is not set to steady, the method involves repeating steps a.), b.), c.), d.), e.), f.), and g.) until the State field in the StrideQ table is set to steady. For step i.), if the State field in the StrideQ table is set to steady, the method involves issuing a prefetch for a calculated virtual address (VA).

In some embodiments, for the disclosed method for improving performance of a stride-based prefetcher on an out-of-order CPU, the Rd Stride is the stride that is currently stored in the StrideQ table for the PC. In addition, in at least one embodiment, the Ld Stride is computed to be equal to the Ld VA minus the read VA (Rd VA) (i.e. Ld Stride=Ld VA−Rd VA). In one or more embodiments, the Rd VA is the VA that is currently stored in the StrideQ table for the PC. In some embodiments, the prefetched VA is calculated to be equal to the read VA (Rd VA) plus the Rd Stride (i.e. VA=Rd VA+Rd Stride).

In at least one embodiment, the disclosed method for improving performance of a stride-based prefetcher on an out-of-order CPU has a matching algorithm process that involves the following steps. In one or more embodiments of the present disclosure, the following ten (10) steps can be processed simultaneously, one at a time, and/or separately in groupings. During the first step, the algorithm involves comparing the Ld Stride with the Rd Stride. If the Ld Stride equals the Rd Stride (i.e. Ld Stride=Rd Stride; which is a load hit match), the algorithm involves updating the Stride field in the StrideQ table with the Ld Stride and updating the VA field in the StrideQ table with the Ld VA. For the second step, the algorithm involves comparing the Ld Stride with the Rd Stride*2. If the Ld Stride equals the Rd Stride*2 (i.e. Ld Stride=Rd Stride*2; which is a load hit match), the algorithm involves updating the Stride field in the StrideQ table with the Rd Stride and updating the VA field in the StrideQ table with a read VA (Rd VA). During the third step, the algorithm involves comparing the Ld Stride with the Rd Stride*4. If the Ld Stride equals the Rd Stride*4 (i.e. Ld Stride=Rd Stride*4; which is a load hit match), the algorithm involves updating the Stride field in the StrideQ table with the Rd Stride and updating the VA field in the StrideQ table with the Rd VA. During the fourth step, the algorithm involves comparing the Ld Stride with the Rd Stride/2. If the Ld Stride equals the Rd Stride/2 (i.e. Ld Stride=Rd Stride/2; which is a load hit match), the algorithm involves updating the Stride field in the StrideQ table with the Ld Stride and updating the VA field in the StrideQ table with the Ld VA.

In some embodiments, for the disclosed matching algorithm process, during the fifth step, the algorithm involves comparing the Ld Stride with the Rd Stride/4. If the Ld Stride equals the Rd Stride/4 (i.e. Ld Stride=Rd Stride/4; which is a load hit match), the algorithm involves updating the Stride field in the StrideQ table with the Ld Stride and updating the VA field in the StrideQ table with the Ld VA. For the sixth step, the algorithm involves comparing the Ld Stride with the negative Rd Stride*2. If the Ld Stride equals the negative Rd Stride*2 (i.e. Ld Stride=−Rd Stride*2; which is a load hit match), the algorithm involves updating the Stride field in the StrideQ table with the negative Rd Stride and updating the VA field in the StrideQ table with the Rd VA. For the seventh step, the algorithm involves comparing the Ld Stride with the negative Rd Stride*4. If the Ld Stride equals the negative Rd Stride*4 (i.e. Ld Stride=−Rd Stride*4; which is a load hit match), the algorithm involves updating the Stride field in the StrideQ table with the negative Rd Stride and updating the VA field in the StrideQ table with the Rd VA.

For the eighth step, the algorithm involves comparing the Ld Stride with the negative Rd Stride/2. If the Ld Stride equals the negative Rd Stride/2 (i.e. Ld Stride=−Rd Stride/2; which is a load hit match), the algorithm involves updating the Stride field in the StrideQ table with the negative Ld Stride and updating the VA field in the StrideQ table with the Rd VA. During the ninth step of the disclosed matching algorithm process, the algorithm involves comparing the Ld Stride with the negative Rd Stride/4. If the Ld Stride equals the negative Rd Stride/4 (i.e. Ld Stride=−Rd Stride/4; which is a load hit match), the algorithm involves updating the Stride field in the StrideQ table with the negative Ld Stride and updating the VA field in the StrideQ table with the Rd VA. For the final step of the matching algorithm process, the tenth step, if the Ld Stride does not equal the Rd Stride, the Rd Stride*2, the Rd Stride*4, the Rd Stride/2, the Rd Stride/4, the negative Rd Stride*2, the negative Rd Stride*4, the negative Rd Stride/2, or the negative Rd Stride/4 (i.e. a load hit miss); the algorithm involves updating the Stride field in the StrideQ table with the Ld Stride and updating the VA field in the StrideQ table with the Ld VA.

In one or more embodiments, for the disclosed method for improving performance of a stride-based prefetcher on an out-of-order CPU, the State field in the StrideQ table is set to steady if the matching algorithm finds a load hit match when using a Rd Stride that has a corresponding State field set to transient, search, or steady. In some embodiments, the State field in the StrideQ table is set to search if the matching algorithm finds a load miss match when using a Rd Stride that has a corresponding State field set to transient. In at least one embodiment, the State field in the StrideQ table is set to transient if the matching algorithm finds a load miss match when using a Rd Stride that has a corresponding State field set to steady.

DRAWINGS

These and other features, aspects, and advantages of the present disclosure will become better understood with regard to the following description, appended claims, and accompanying drawings where:

FIG. 2 shows a table illustrating prefetches for an L2-cache of the system for improving performance of a stride-based prefetcher on an out-of-order central processing unit (CPU), in accordance with at least one embodiment of the present disclosure.

FIG. 4 depicts a table illustrating the stride predictions of the system for improving performance of a stride-based prefetcher on an out-of-order CPU, in accordance with at least one embodiment of the present disclosure.

FIG. 5 illustrates a diagram of the stride prediction state transitions of the system for improving performance of a stride-based prefetcher on an out-of-order CPU, in accordance with at least one embodiment of the present disclosure.

FIG. 8B illustrates a table showing the calculated stride predictions for the exemplary set of PC instructions of FIG. 8A when using the logic flow presented in the logic diagrams of FIGS. 6 and 7, in accordance with at least one embodiment of the present disclosure.

FIG. 8C shows the calculations performed by the matching algorithm for the exemplary set of PC instructions of FIG. 8A when using the logic flow presented in the logic diagram of FIG. 7, in accordance with at least one embodiment of the present disclosure.

DESCRIPTION

Figure 1:
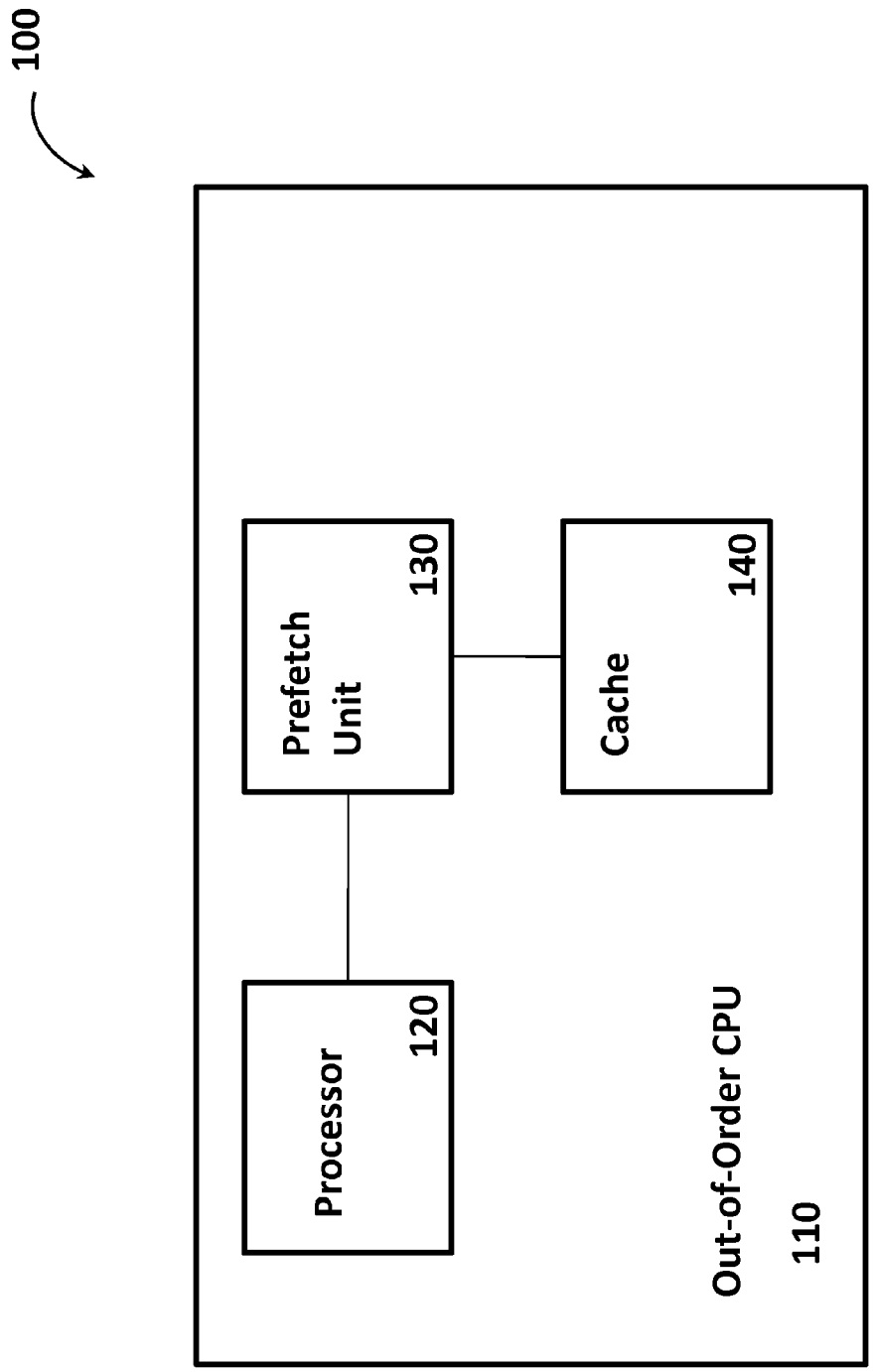
FIG. 1 shows a simplified block diagram of the disclosed system for improving performance of a stride-based prefetcher on an out-of-order central processing unit (CPU), in accordance with at least one embodiment of the present disclosure.

The methods and apparatus disclosed herein provide an operative system for improving performance of a stride-based prefetcher. In particular, this disclosed system is utilized for improving performance of a stride-based prefetcher on an out-of-order central processing unit (CPU). An out-of-order CPU is a CPU that is able to execute instructions in an order rather than by the availability of input data, rather than by the instructions original order in a program, thereby helping the CPU to avoid being idle while data is retrieved for the next instruction in a program. Specifically, the disclosed system employs out-of-order stride prefetch units to generate an estimate of the correct access stride from past out-of-order virtual address (VA) accesses. During operation of the disclosed system, the out-of-order stride prefetch units examine the offsets between past VA accesses and the directions of the past VA accesses in order to generate an estimate of the VA access stride of the executed program code (PC). The out-of-order stride prefetch units then use the estimate of the VA access stride in order to generate a prediction of future VA accesses. After the out-of-order stride prefetch units have generated the prediction of the future VA accesses, the out-of-order stride prefetch units issue prefetches for the predicted future VA accesses.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

The disclosed processor system includes a processor that performs demand driven hardware prefetches. A significant proportion of memory accesses in a typical program are to successive cache lines (i.e. a stream access pattern) or are through load instructions executed in loops to locations separated by a stride (i.e. a stride access pattern). The stride access patterns can be either a constant-stride access pattern, which has VA accesses that are all in one constant direction, or an out-of-order stride access pattern, which has VA accesses that are in varying directions. All of these types of accesses offer significant opportunities for a reduction in access latency by prefetching the data into caches. However, it should be noted that prefetching data for other types of accesses (e.g., for unrelated or irregular loads, for loads traversing a linked list, and/or for stores) is more difficult to perform.

The disclosed system utilizes a hybrid hardware-based data prefetch scheme to prefetch data for stream access patterns and for stride access patterns. The processor system contains a Stream Queue (StreamQ) for issuing prefetches for stream access patterns, and a Stride Queue (StrideQ) for issuing prefetches for stride access patterns. The disclosed processor system's stream prediction scheme, stride prediction scheme, and hybrid prefetch scheme will be discussed in detail below.

FIG. 1 shows a simplified block diagram 100 of the disclosed system for improving performance of a stride-based prefetcher on an out-of-order central processing unit (CPU) 110, in accordance with at least one embodiment of the present disclosure. In this figure, an out-of-order CPU 110 is shown to include a processor 120, a prefetch unit 130, and a cache 140. The processor 120 is used to execute program code (PC). It should be noted that in other embodiments, the out-of-order CPU 110 may include more than one processor 120 and/or more than one cache 140. The cache 140 and the prefetch unit 130 are associated with the processor 120. The prefetch unit 130 includes a StreamQ and/or a StrideQ. The processor 120 sends load instructions to the prefetch unit 130. In response, the prefetch unit 130 fetches data out of the cache 140 and forwards the data to the processor 120. Details regarding how the StreamQ (i.e. the stream prediction scheme) and StrideQ (i.e. the stride prediction scheme) of the prefetch unit 130 operate are discussed in the following paragraphs.

Stream Prediction Scheme

In one or more embodiments, the disclosed processor system utilizes a stream prediction scheme that detects accesses to sequentially increasing or decreasing cache lines and issues prefetches to the next cache line in the access pattern. A table of previous cache misses is maintained by storing the virtual address (VA) incremented (or decremented) to the next successive cache line in a 32-entry content-addressable memory (CAM) structure. FIG. 2 shows a table illustrating prefetches for an L2-cache of the disclosed system. Only the cache line address is stored. The bits corresponding to the offset within the cache line are dropped. The virtual address for each new cache miss (or hit to a prefetched line) is looked up in this structure. If there is a hit, then the stream is confirmed, the stored virtual address is incremented (or decremented) to the next successive cache line, and a L1-cache prefetch is issued to this address.

When a higher degree of confidence is achieved in the prediction by the occurrence of successive hits to its entry, the L2-cache prefetches to the next several lines (e.g., as shown in FIG. 2, the L2-cache prefetches to VA+2 and VA+4 are issued at the same time as the L1-cache prefetch to VA+1). During the startup phase of the L2-cache prefetch, prefetches to VA+2 are issued. Upon gaining additional confidence in the prediction, prefetches to VA+2 and VA+4 are issued. After a few iterations, only a prefetch to VA+4 needs to be issued because a prefetch to VA+2 would have already been issued by the L2-cache two cycles earlier as is shown in FIG. 2. The L2-cache has a much higher miss penalty than the L1-cache. Issuing the L2-cache prefetches earlier helps to cover that penalty. Also shown in FIG. 2, the lines are brought into the L1-cache by subsequent L1 prefetches.

Stride Prediction Scheme

Figure 3:
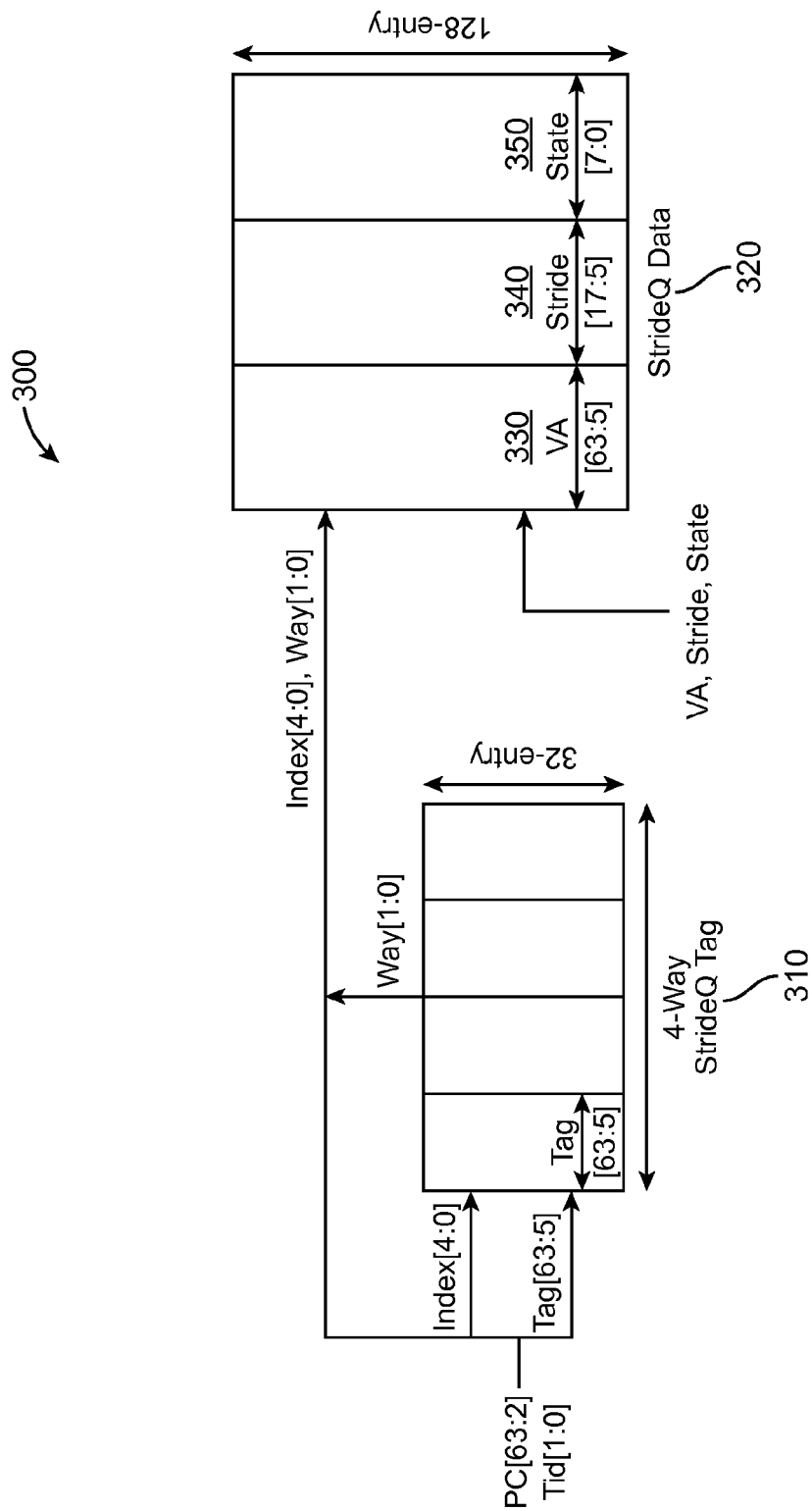
FIG. 3 illustrates a diagram of the Stride Queue (StrideQ) of the system for improving performance of a stride-based prefetcher on an out-of-order CPU, in accordance with at least one embodiment of the present disclosure.

The disclosed system employs a stride prediction scheme that prefetches the data into a L1-cache (L1$) for a particular load instruction that is executed in a loop and accesses successive locations separated by an out-of-order stride pattern or a constant-stride pattern. A hardware structure, referred to as a Stride Queue (StrideQ) 300, maintains the information needed to issue the prefetches. This hardware structure includes, for example, of a 32-entry×4-way random-access memory (RAM) (i.e. a total of 128 entries) 310, which stores the program code (PC), and a 128-entry×1-way RAM 320, which stores the Address, Stride, and State for a load miss in each of its entries. FIG. 3 illustrates a diagram of the StrideQ 300 of the disclosed system for improving performance of a stride-based prefetcher on an out-of-order CPU.

The Stride Queue 300 includes four fields, which are (1) Program Code (PC) 310, (2) Load Address (i.e. VA) 330, (3) Stride 340, and (4) State 350. The PC field 310 contains the PC of the load instruction (along with the tag identifier (Tid)) that missed in the L1$. The PC field 310 is stored in the 32-entry×4-way RAM structure 310. The current L1$ miss PC is used to look up in this structure and uniquely identify the load instruction. The output of the structure is a hit/miss signal. These bits are initialized with the PC when an entry is first created for a particular load miss.

The Load Address field 330 contains the address of the L1$ line miss. Only the cache line address is stored in this field. Lower order bits, which indicate the cache line offset bits, are dropped. A previous Load Address is compared with the current L1$ miss address for the load with the same PC to compute the stride. These bits are initialized with the miss address when an entry is first created for a particular load miss. The entry is updated with the load address for each subsequent L1$ miss with the same PC.

The Stride field 340 contains the address offset between two successive L1$ line misses for the same load instruction (i.e. for the same PC). These bits contain random values when an entry is first allocated. On each subsequent miss, the previous miss address stored in the out-of-order stride prefetch unit is compared with the current miss address to compute the stride. If the current stride matches the previous stride stored in the out-of-order stride prefetch unit, then the state is updated to indicate a higher confidence level. When an appropriate confidence level is reached, a prefetch is initiated to the line addressed by the current miss address plus the stride.

FIG. 4 depicts a table 400 illustrating the stride predictions of the disclosed system for improving performance of a stride-based prefetcher on an out-of-order CPU, in accordance with at least one embodiment of the present disclosure. This stride prediction table 400 is employed by out-of-order stride prefetch units to generate the stride predictions for the disclosed system. The use of this table 400 to generate the stride predictions will be explained in detail during the discussion of FIGS. 8A, 8B, and 8C.

The State field (refer to item 350 in FIG. 3) is a field (e.g., two-bit field) that records the history of the particular entry and governs the prefetch. FIG. 5 illustrates a diagram 500 of the stride prediction state transitions of the disclosed system for improving performance of a stride-based prefetcher on an out-of-order CPU. The State field 350 contains one of three states. The three states are: (1) transient 510, (2) steady 520, and (3) search 530.

The State field 350 is set to transient 510 when the newly computed stride does not match (i.e. a load miss) the stored stride that is in steady 520 state, thereby indicating that there is an irregular access pattern.

The State field 350 is set to steady 520 when the newly computed stride matches (i.e. a load hit) a stored stride that is in transient 510 state, search 530 state, or steady 520 state. The steady 520 state indicates that a regular stride pattern has been detected with enough confidence and, as such, a prefetch can be initiated to the next address in the access pattern.

The State field 350 is set to search 530 when the newly computed stride does not match (i.e. a load miss) a stored stride in transient 510 state. This state indicates that the out-of-order stride prefetch unit is still in the process of detecting a stride pattern.

Figure 6:
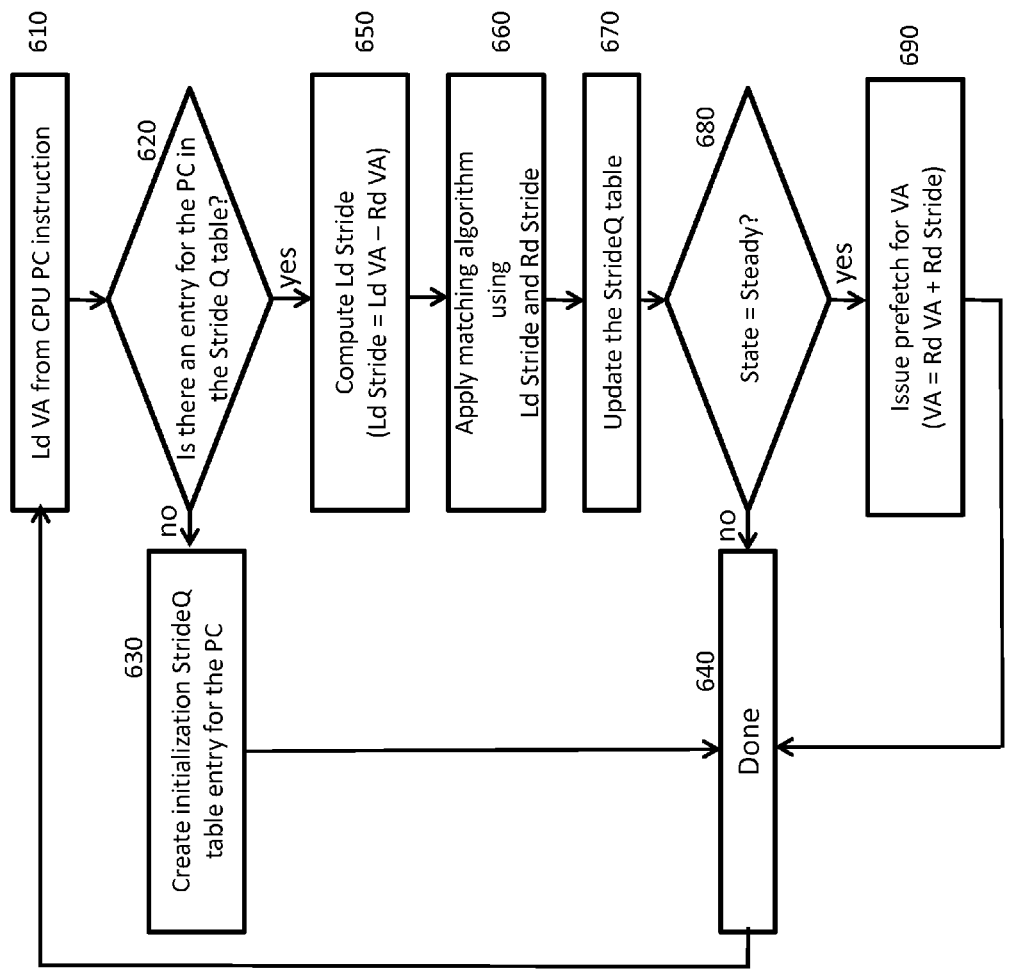
FIG. 6 shows a logic diagram for generating the stride predictions of the system for improving performance of a stride-based prefetcher on an out-of-order CPU, in accordance with at least one embodiment of the present disclosure.

FIG. 6 shows a logic diagram for generating the stride predictions of the disclosed system for improving performance of a stride-based prefetcher on an out-of-order CPU. In this figure, the out-of-order stride prefetch unit first loads a virtual address (Ld VA) from a CPU program code (PC) instruction 610. The instruction is from a particular program code (PC) (e.g., PC=100) that is being executed by the CPU. After the out-of-order stride prefetch unit loads the virtual address, the out-of-order stride prefetch unit determines whether there is an entry for the PC in the StrideQ table (refer to FIG. 8B) 620. If the out-of-order stride prefetch unit determines that there is no entry for the PC in the StrideQ table, the out-of-order stride prefetch unit creates an initialization StrideQ table entry for that particular PC 630. Then, after the out-of-order stride prefetch unit creates an initialization StrideQ table entry, the logic for that iteration of PC is complete 640, and the logic repeats for the next iteration starting from step 610.

However, if the out-of-order stride prefetch unit determines that there is an entry for the PC in the StrideQ table, the out-of-order stride prefetch unit computes the load stride (Ld Stride) 650. The Ld Stride is computed to be equal to the Ld VA minus the read virtual address (Rd VA) (i.e. Ld Stride=Ld VA−Rd VA). The Rd VA is the virtual address that is read out of the StrideQ table. After the out-of-order stride prefetch unit computes the Ld Stride, the out-of-order stride prefetch unit applies the matching algorithm using the Ld Stride and the read stride (Rd Stride) 660. The Rd Stride is the stride that is read out of the StrideQ table. The matching algorithm will be explained in detail during the discussion of FIG. 7.

After the out-of-order stride prefetch unit applies the matching algorithm, the out-of-order stride prefetch unit updates the StrideQ table according to the matching algorithm results 670. Then, after the out-of-order stride prefetch unit updates the StrideQ table, the out-of-order stride prefetch unit determines if the State field in the StrideQ table is set to steady 680. If the out-of-order stride prefetch unit determines that the State field is not set to steady, then the logic for that iteration of PC is complete 640, and the logic repeats for the next iteration starting from step 610 until the State field in the StrideQ table is set to steady.

Conversely, if the out-of-order stride prefetch unit determines that the State field in the StrideQ table is set to steady, the out-of-order stride prefetch unit issues a prefetch for a calculated virtual address (VA) 690. The calculated VA is computed to equal the read virtual address (Rd VA) plus the Rd Stride (i.e. VA=Rd VA+Rd Stride). After the out-of-order stride prefetch unit issues the prefetch for the calculated VA, the logic for that PC iteration is done 640, and the logic repeats for the next iteration of the PC starting from step 610.

Figure 7:
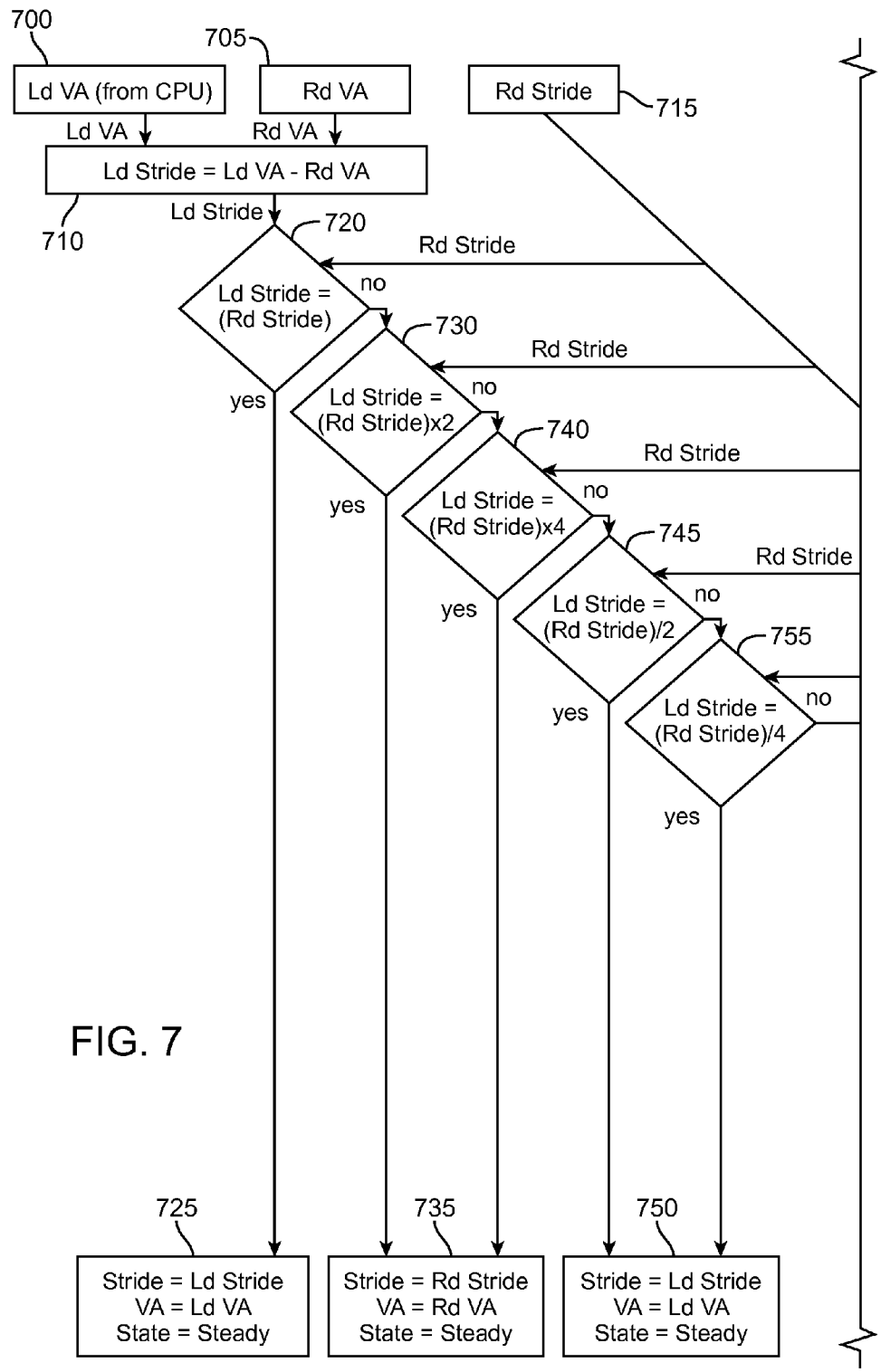
FIG. 7 illustrates a logic diagram for the matching algorithm of FIG. 6, in accordance with at least one embodiment of the present disclosure.
Figure 7:
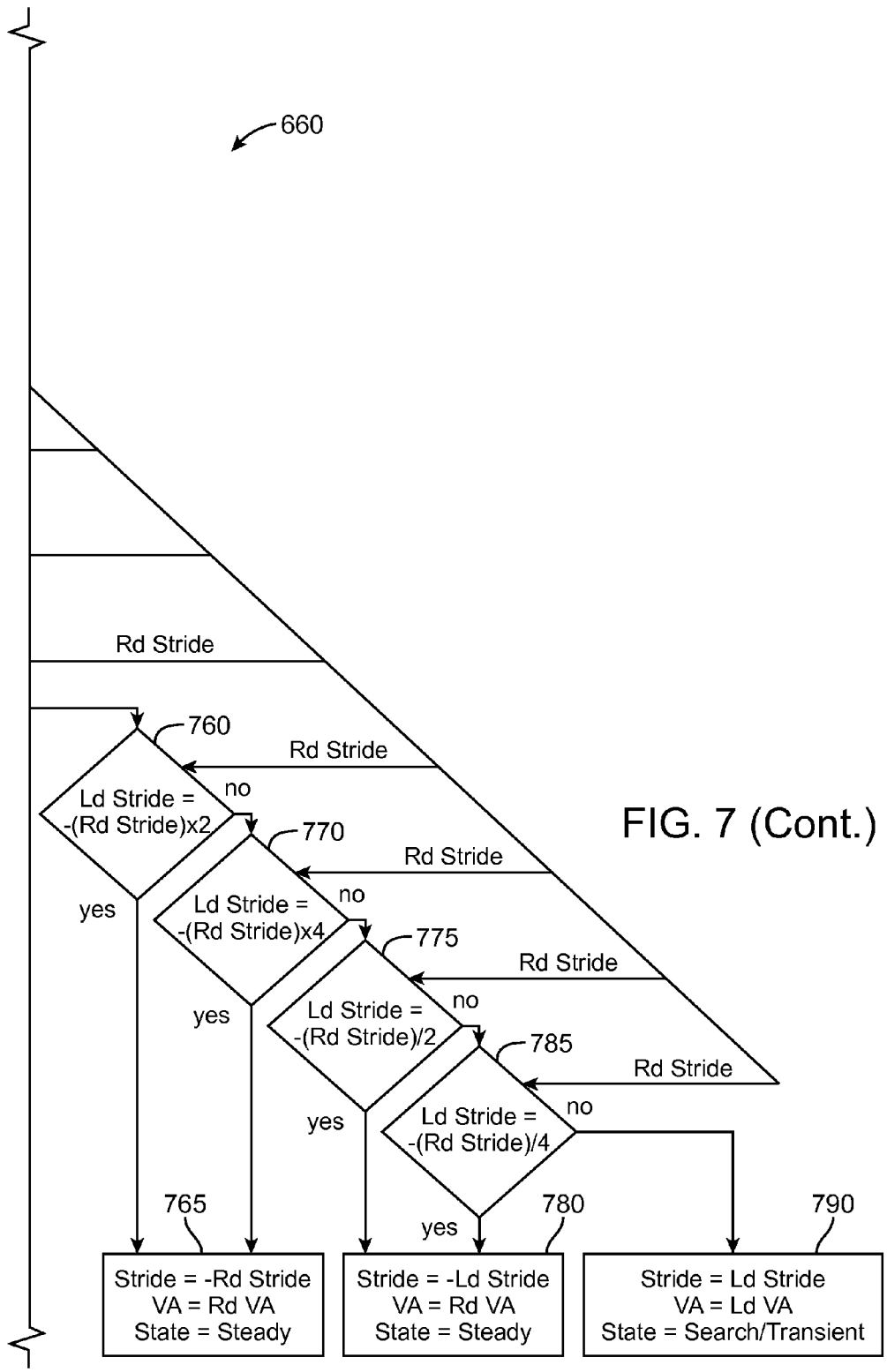

FIG. 7 illustrates a logic diagram for the matching algorithm 660 of FIG. 6 for the disclosed system. In this figure, the out-of-order stride prefetch unit starts the matching algorithm logic by first computing the Ld Stride 710 by subtracting the Rd VA 705 from the Ld VA 700 (i.e. Ld Stride=Ld VA−Rd VA). After the out-of-order stride prefetch unit has computed the Ld Stride, the out-of-order stride prefetch unit determines whether the Ld Stride is equal to the Rd Stride 715 (i.e. Ld Stride=Rd Stride) 720. If the out-of-order stride prefetch unit determines that the Ld Stride equals the Rd Stride, the out-of-order stride prefetch unit updates the Stride field, the Virtual Address (VA) field, and the State field of the StrideQ table (refer to FIG. 7B) with the entries Ld Stride, Ld VA, and steady, respectively 725.

However, if the out-of-order stride prefetch unit determines that the Ld Stride does not equal the Rd Stride, the out-of-order stride prefetch unit then determines whether the Ld Stride is equal to one of the various quantities calculated based on the Rd Stride (e.g., various multiple and/or fractions of the Rd Stride). For example, the out-of-order stride prefetch unit then determines whether the Ld Stride is equal to the Rd Stride multiplied by two (i.e. Ld Stride=Rd Stride*2) 730. If the out-of-order stride prefetch unit determines that the Ld Stride equals the Rd Stride*2, the out-of-order stride prefetch unit updates the Stride field, the VA field, and the State field of the StrideQ table with the entries Rd Stride, Rd VA, and steady, respectively 735. Since the Ld Stride is equal to the Rd Stride multiplied by two, this implies that the Ld Stride is greater than the Rd Stride. As such, the smaller value of the two (i.e. the Rd Stride), which is the smallest estimated VA Stride, gets stored in the Stride field of the table.

Conversely, if the out-of-order stride prefetch unit determines that the Ld Stride does not equal the Rd Stride*2, the out-of-order stride prefetch unit determines whether the Ld Stride is equal to the Rd Stride multiplied by four (i.e. Ld Stride=Rd Stride*4) 740. If the out-of-order stride prefetch unit determines that the Ld Stride equals the Rd Stride*4, then the out-of-order stride prefetch unit updates the Stride field, the VA field, and the State field of the StrideQ table with the entries Rd Stride, Rd VA, and steady, respectively 735.

However, if the out-of-order stride prefetch unit determines that the Ld Stride does not equal the Rd Stride*4, the out-of-order stride prefetch unit determines whether the Ld Stride is equal to the Rd Stride divided by two (i.e. Ld Stride=Rd Stride/2) 745. If the out-of-order stride prefetch unit determines that the Ld Stride equals the Rd Stride/2, then the out-of-order stride prefetch unit updates the Stride field, the VA field, and the State field of the StrideQ table with the entries Ld Stride, Ld VA, and steady, respectively 750.

On the other hand, if the out-of-order stride prefetch unit determines that the Ld Stride does not equal the Rd Stride/2, then the out-of-order stride prefetch unit determines whether the Ld Stride is equal to the Rd Stride divided by four (i.e. Ld Stride=Rd Stride/4) 755. If the out-of-order stride prefetch unit determines that the Ld Stride equals the Rd Stride/4, then the out-of-order stride prefetch unit updates the Stride field, the VA field, and the State field of the StrideQ table with the entries Ld Stride, Ld VA, and steady, respectively 750.

However, if the out-of-order stride prefetch unit determines that the Ld Stride does not equal the Rd Stride/4, the out-of-order stride prefetch unit then determines whether the Ld Stride is equal to the negative Rd Stride multiplied by two (i.e. Ld Stride=−Rd Stride*2) 760. If the out-of-order stride prefetch unit determines that the Ld Stride equals the −Rd Stride*2, then the out-of-order stride prefetch unit updates the Stride field, the VA field, and the State field of the StrideQ table with the entries −Rd Stride (i.e. negative Rd Stride), Rd VA, and steady, respectively 765.

Conversely, if the out-of-order stride prefetch unit determines that the Ld Stride does not equal the −Rd Stride*2, the out-of-order stride prefetch unit then determines whether the Ld Stride is equal to the negative Rd Stride multiplied by four (i.e. Ld Stride=−Rd Stride*4) 770. If the out-of-order stride prefetch unit determines that the Ld Stride equals the −Rd Stride*4, then the out-of-order stride prefetch unit updates the Stride field, the VA field, and the State field of the StrideQ table with the entries −Rd Stride, Rd VA, and steady, respectively 765.

However, if the out-of-order stride prefetch unit determines that the Ld Stride does not equal the −Rd Stride*4, the out-of-order stride prefetch unit determines whether the Ld Stride is equal to the negative Rd Stride divided by two (i.e. Ld Stride=−Rd Stride/2) 775. If the out-of-order stride prefetch unit determines that the Ld Stride equals the −Rd Stride/2, then the out-of-order stride prefetch unit updates the Stride field, the VA field, and the State field of the StrideQ table with the entries −Ld Stride (i.e. negative Ld Stride), Rd VA, and steady, respectively 780.

On the other hand, if the out-of-order stride prefetch unit determines that the Ld Stride does not equal the −Rd Stride/2, then the out-of-order stride prefetch unit determines whether the Ld Stride is equal to the negative Rd Stride divided by four (i.e. Ld Stride=−Rd Stride/4) 785. If the out-of-order stride prefetch unit determines that the Ld Stride equals the −Rd Stride/4, then the out-of-order stride prefetch unit updates the Stride field, the VA field, and the State field of the StrideQ table with the entries −Ld Stride, Rd VA, and steady, respectively 780.

However, if the out-of-order stride prefetch unit determines that the Ld Stride does not equal the −Rd Stride/4, the out-of-order stride prefetch unit updates the Stride field, the VA field, and the State field of the StrideQ table with the entries Ld Stride, Ld VA, and search I transient, respectively 790. It should be noted that the logic for determining whether the State field will set to search or transient is presented in FIG. 5. It should also be noted that in one or more embodiments of the present disclosure, the logic steps of the matching algorithm can be processed simultaneously, one at a time, and/or separately in groupings.

Figure 8A:
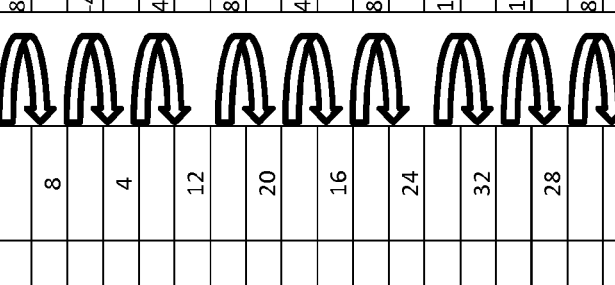
FIG. 8A depicts a table showing the calculated Load Strides (Ld Strides) for an exemplary set of program code (PC) instructions using the logic flow presented in the logic diagrams of FIGS. 6 and 7, in accordance with at least one embodiment of the present disclosure.

FIGS. 8A, 8B, and 8C show an example of how the out-of-order stride prefetch units generate estimates of the strides and predictions of the future VA accesses. In particular, FIG. 8A depicts a table showing the calculated Load Strides (Ld Strides) for an exemplary set of program code (PC) instructions using the logic flow presented in the logic diagrams of FIGS. 6 and 7. FIG. 8B illustrates a table showing the calculated stride predictions for the exemplary set of PC instructions of FIG. 8A when using the logic flow presented in the logic diagrams of FIGS. 6 and 7. And, FIG. 8C shows the calculations performed by the matching algorithm for the exemplary set of PC instructions of FIG. 8A when using the logic flow presented in the logic diagram of FIG. 7.

Iteration 0

Following the logic presented in the diagram of FIG. 6, for a particular PC (i.e. PC=100), the out-of-order stride prefetch unit for iteration 0 first loads the virtual address (Ld VA) from the PC instruction 610. (See FIG. 8A where the Ld VA of 0 is entered into the table for iteration 0). The out-of-order stride prefetch unit then determines whether there is an entry for the PC in the StrideQ table 620. (Note that FIG. 8B shows the four fields (PC, VA, Stride, and State) that are contained in the StrideQ table.). Initially, there is no entry in the StrideQ table for iteration 0 of PC=100. Since there is no entry in the StrideQ table for iteration 0 of PC=100, the out-of-order stride prefetch unit creates an initialization StrideQ table entry 630 for PC=100. (See FIG. 8B to see the entries that were created for the four fields for iteration 0.).

Iteration 1

After the out-of-order stride prefetch unit creates an initialization StrideQ table entry, the out-of-order stride prefetch unit for iteration 1 loads the VA (Ld VA) from the PC instruction 610. (See FIG. 8A where the Ld VA of 8 is entered into the table for iteration 1). Then, the out-of-order stride prefetch unit determines whether there is an entry for the PC in the StrideQ table 620. The out-of-order stride prefetch unit finds that there is an entry for the PC in the StrideQ table because the out-of-order stride prefetch unit had created an entry for the PC during iteration 0.

Next, the out-of-order stride prefetch unit computes the Ld Stride 650 to be equal to the Ld VA minus the Rd VA (Ld Stride=Ld VA−Rd VA=8−0=8). (See FIG. 8A to see the computation of the Ld Stride). The Rd VA is the current value stored in the VA field of the StrideQ table. (See FIG. 8B where the VA is 0 for iteration 0). After the out-of-order stride prefetch unit computes the Ld Stride, the out-of-order stride prefetch unit applies the matching algorithm using the Ld Stride (8) and the Rd Stride (init) 660. The Rd Stride is the current value stored in the Stride field of the StrideQ table. (See FIG. 8B where the Stride is init, or 0, for iteration 0).

Following the logic for the matching algorithm presented in the diagram of FIG. 7, the matching algorithm determines that there is no match and, thus, there is a load miss. (See FIG. 8C where the matching algorithm determines that 8 is not an element of 0 for iteration 1). Then, the out-of-order stride prefetch unit updates the StrideQ table 670 according to the stride prediction table of FIG. 4. (See FIG. 4 that shows that when there is a load miss (i.e. not equal), the Stride field is updated with the Ld Stride, the VA field is updated with the Ld VA, and the State field is updated with either search or transient). As such, the out-of-order stride prefetch unit updates the Stride field with the Ld Stride (8) and the VA field with the Ld VA (8). (See FIG. 8B where the Stride field is 8 and the VA field is 8 for iteration 1). The out-of-order stride prefetch unit determines whether to update the State field with search or transient by following the logic presented in the diagram of FIG. 5. Since there was a load miss from a stride that was previously set to search state (See FIG. 8B that shows that the State field for iteration 0 is set to search), the out-of-order stride prefetch unit, following the logic of FIG. 5, updates the State field with search. (See FIG. 8B where the State field is search for iteration 1).

After the out-of-order stride prefetch unit has updated the StrideQ table, the out-of-order stride prefetch unit determines whether the State field is set to steady 680. The out-of-order stride prefetch unit then finds that the State field is not set to steady.

Iteration 2

Since the State field is not set to steady, the out-of-order stride prefetch unit, for iteration 2, loads the VA (Ld VA) from the PC instruction 610. (See FIG. 8A where the Ld VA of 4 is entered into the table for iteration 2). The out-of-order stride prefetch unit then determines whether there is an entry for the PC in the StrideQ table 620. The out-of-order stride prefetch unit finds that there is an entry for the PC in the StrideQ table.

Then, the out-of-order stride prefetch unit computes the Ld Stride 650 to be equal to the Ld VA minus the Rd VA (Ld Stride=Ld VA−Rd VA=4−8=−4). (See FIG. 8A to see the computation of the Ld Stride). The Rd VA is the current value stored in the VA field of the StrideQ table. (See FIG. 8B where the VA is 8 for iteration 1). After the out-of-order stride prefetch unit computes the Ld Stride, the out-of-order stride prefetch unit applies the matching algorithm using the Ld Stride (−4) and the Rd Stride (8) 660. The Rd Stride is the current value stored in the Stride field of the StrideQ table. (See FIG. 8B where the Stride is 8 for iteration 1).

Next, following the logic for the matching algorithm presented in the diagram of FIG. 7, the matching algorithm determines that there is a match for −Rd Stride/2 (i.e. Ld Stride=−Rd Stride/2) and, thus, there is a load hit. (See FIG. 8C where the matching algorithm determines that −4 is a element of {8, 16, 32, 4, 2, −16, −32, −4, −2} for iteration 2). Then, the out-of-order stride prefetch unit updates the StrideQ table 670 according to the stride prediction table of FIG. 4. (See FIG. 4 that shows that when there is a load hit of −Rd Stride/2, the Stride field is updated with the −Ld Stride, the VA field is updated with the Rd VA, and the State field is updated with steady). As such, the out-of-order stride prefetch unit updates the Stride field with the −Ld Stride (−(−4)=4) and the VA field with the Rd VA (8). (See FIG. 8B where the Stride field is 4, the VA field is 8, and the State field is steady for iteration 2).

After the out-of-order stride prefetch unit has updated the StrideQ table, the out-of-order stride prefetch unit determines whether the State field is set to steady 680. The out-of-order stride prefetch unit then finds that the State field is set to steady. Since the State field is set to steady, the out-of-order stride prefetch unit issues a prefetch for a calculated VA 690. The calculated VA is equal to the Rd VA plus the Rd Stride (i.e. VA=Rd VA+Rd Stride=8+4=12). (See FIG. 8B that shows that the VA field is 8 (Rd VA) and the Stride field (Rd Stride) is 4 for iteration 2). As such, the out-of-order stride prefetch unit issues a prefetch for VA 12. (See FIG. 8B that shows that the Prefetch entry is VA 12 for iteration 2).

Iteration 3

After the out-of-order stride prefetch unit issues the prefetch, the out-of-order stride prefetch unit, for iteration 3, loads the VA (Ld VA) from the PC instruction 610. (See FIG. 8A where the Ld VA of 12 is entered into the table for iteration 3). The out-of-order stride prefetch unit then determines whether there is an entry for the PC in the StrideQ table 620. The out-of-order stride prefetch unit finds that there is an entry for the PC in the StrideQ table.

The out-of-order stride prefetch unit then computes the Ld Stride 650 to be equal to the Ld VA minus the Rd VA (Ld Stride=Ld VA−Rd VA=12−8=4). (See FIG. 8A to see the computation of the Ld Stride). The Rd VA is the current value stored in the VA field of the StrideQ table. (See FIG. 8B where the VA is 8 for iteration 2). After the out-of-order stride prefetch unit computes the Ld Stride, the out-of-order stride prefetch unit applies the matching algorithm using the Ld Stride (4) and the Rd Stride (4) 660. The Rd Stride is the current value stored in the Stride field of the StrideQ table. (See FIG. 8B where the Stride is 4 for iteration 2).

Following the logic for the matching algorithm presented in the diagram of FIG. 7, the matching algorithm determines that there is a match for Rd Stride (i.e. Ld Stride=Rd Stride) and, thus, there is a load hit. (See FIG. 8C where the matching algorithm determines that 4 is a element of {4, 8, 16, 2, 1, −8, −16, −2, −1} for iteration 3). Then, the out-of-order stride prefetch unit updates the StrideQ table 670 according to the stride prediction table of FIG. 4. (See FIG. 4 that shows that when there is a load hit of Rd Stride, the Stride field is updated with the Ld Stride, the VA field is updated with the Ld VA, and the State field is updated with steady). Thus, the out-of-order stride prefetch unit updates the Stride field with the Ld Stride (4) and the VA field with the Ld VA (12). (See FIG. 8B where the Stride field is 4, the VA field is 12, and the State field is steady for iteration 3).

After the out-of-order stride prefetch unit has updated the StrideQ table, the out-of-order stride prefetch unit determines whether the State field is set to steady 680. The out-of-order stride prefetch unit then finds that the State field is set to steady. Since the State field is set to steady, the out-of-order stride prefetch unit issues a prefetch for a calculated VA 690. The calculated VA is equal to the Rd VA plus the Rd Stride (i.e. VA=Rd VA+Rd Stride=12+4=16). (See FIG. 8B that shows that the VA field is 12 (Rd VA) and the Stride field (Rd Stride) is 4 for iteration 3). As such, the out-of-order stride prefetch unit issues a prefetch for VA 16. (See FIG. 8B that shows that the Prefetch entry is VA 16 for iteration 3).

Iterations 4 through 10

After the out-of-order stride prefetch unit issues a prefetch for the calculated VA, the logic presented in FIGS. 6 and 7 repeats for the following iterations (i.e. for iterations 4 through 10) of the exemplary set of PC instructions of FIG. 8A.

Hybrid Prefetch Scheme

Figure 9:
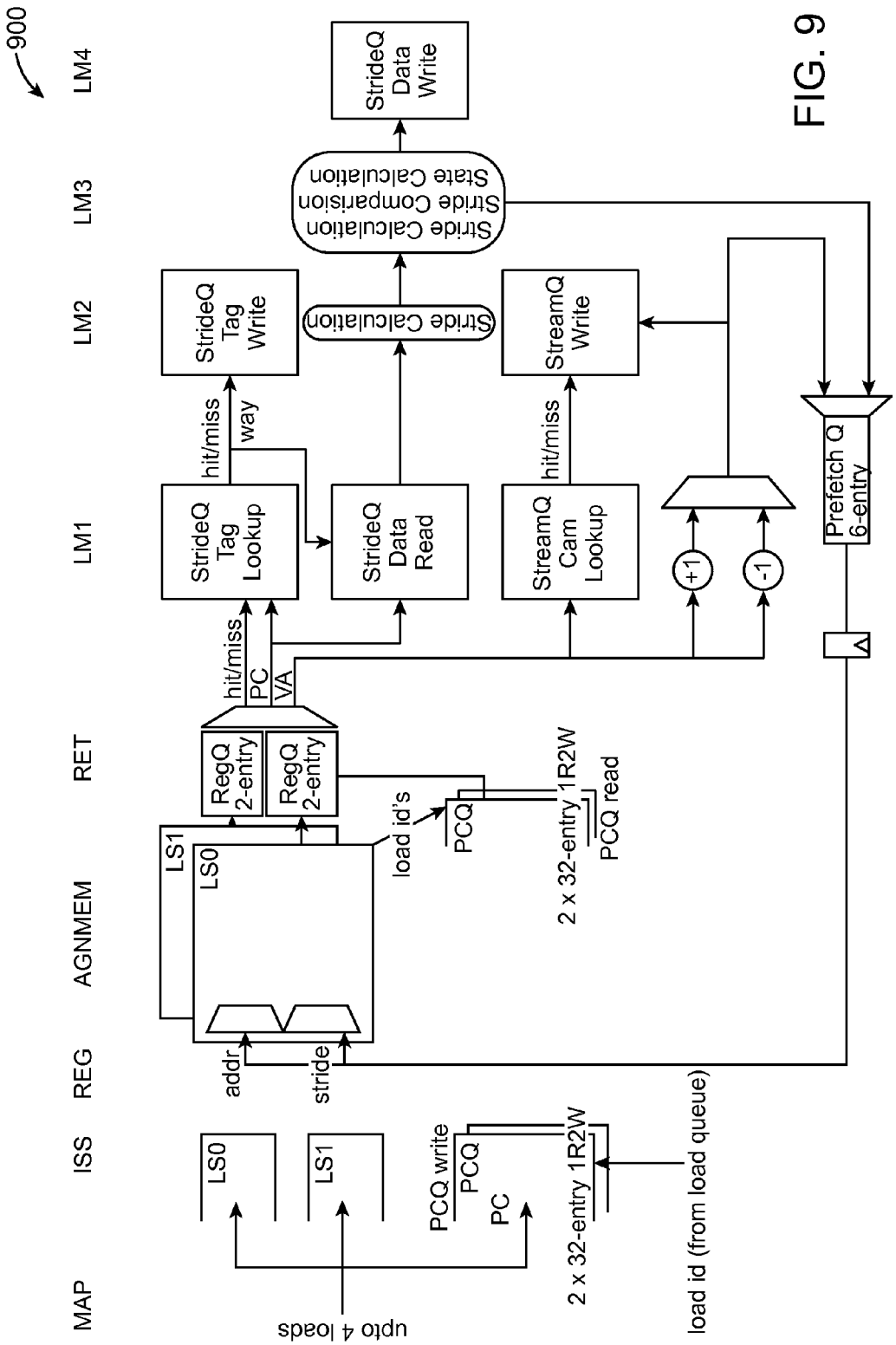
FIG. 9 shows a diagram illustrating the prefetch logic that occurs within the processor pipeline of the system for improving performance of a stride-based prefetcher on an out-of-order CPU, in accordance with at least one embodiment of the present disclosure.

The operation of the prefetch logic within the rest of the pipeline is shown in FIG. 9. More specifically, FIG. 9 shows a diagram 900 illustrating the prefetch logic that occurs within the processor pipeline of the system for improving performance of a stride-based prefetcher on an out-of-order CPU, in accordance with at least one embodiment of the present disclosure.

Up to two (2) load instructions can be sent to each of the LS0 and the LS1 issue queues (i.e. for a total of four loads) in the instruction-set simulator (ISS) stage. A unique 5-bit load identification (ID) is assigned to each of these loads. Up to thirty-two loads can be in-flight between the dispatch point and the retire point. The PCs corresponding to each load are stored in two 32-entry, 62-bit, 1 R2W structures that are each indexed by a load ID (i.e. one Load ID for each LS unit). This structure is called the PC queue (PCQ). Up to two loads can be issued per cycle. The loads flow through the pipe-line as described earlier, and generate a hit/miss signal in the RET stage. The load ID and miss address are available at the same time.

Load misses and/or hits to prefetched lines flow through rest of the prefetch logic. The two load IDs are used to look up the PCQ in the same cycle using the load ID. The PC/VA/Hit/Miss information for a load miss or a load hit to a prefetched line arbitrate for prefetch logic access. The losing load is stored in a two-entry queue from where it will take part in arbitration again.

In the next stage, the LM1 stage, the winning load is used to look up the Stream Queue CAM and Stride Queue tag RAM. Also in this stage, the PC is used to look up the Stride Queue, and the VA is used to look up the Stream Queue. It should be noted that a hit in the StrideQ overrides a hit in the StreamQ.

Upon a miss in the stream queue, an entry is allocated in an NMRU (i.e. not most recently used) fashion. The entry is initialized with the VA incremented to or decremented to the next cache-line based on the direction of the stream. The initial direction is guessed based on the position of the VA within the cache line. If the address is in the upper half of the cache line, then the direction is guessed to be down, otherwise it is guessed to be up. When a subsequent load instruction's VA matches this entry, then a stream is confirmed, and a prefetch is issued at the same time. In addition, the address is updated according to the direction. Additional prefetches are issued on subsequent hits to this entry in the StreamQ. Also, additional state information is stored in this entry to track its confidence level as well as issue L2-cache prefetches.

Upon a miss in the Stride queue, an entry is allocated in the LM2 stage in an LRU fashion. When a subsequent load instruction's PC matches an entry in the StreamQ, then the stride detection protocol described in FIGS. 5 and 6 is followed. The stored VA, Stride, and State are looked up in the LM1 stage. The stored VA and load VA are compared in order to compute the Stride in the LM2 stage. The computed stride is compared with stored stride, and the state is determined accordingly. This is done in the LM3 stage. In addition, the VA, Stride, and State fields are updated in the LM4 stage. Additional prefetches are issued on subsequent hits to this entry in the StrideQ. Additional state information is stored in the entry to track its confidence level and to issue L2-cache prefetches. When a load instruction hits both the StreamQ and the StrideQ, the prefetch generated by the StrideQ supercedes.

The prefetch requests are stored in a queue (e.g., a six entry queue) which contains the prefetch VA and the stride. The Stride field is set to one (1) for stream prefetches. Additional attribute bits, which indicate an L1-cache prefetch request (e.g., a prefetch to VA or an L2-cache prefetch request (e.g., a prefetch to VA+2*stride or a prefetch to VA+4*stride) are stored with the entry. The L1-cache prefetches are issued to the LS1 pipe, and the L2-cache prefetches are issued to the LS0 pipe. These requests are accepted by their corresponding pipes whenever no regular instruction is issued. The appropriate bit is cleared when its prefetch has been accepted. Since the benefit of a prefetch request decreases with its age, the oldest entry is used when no more empty entries remain for a new request.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A system, comprising:
   a processor in an out-of-order central processing unit (CPU) configured to execute program code (PC) comprising a current instruction;
   a cache coupled to the processor; and
   an out-of-order stride prefetch unit coupled to the processor, wherein the out-of-order stride prefetch unit is configured to:
   generate a load virtual address (VA) access stride using an offset between a past VA access and a current VA access, the current VA access is retrieved from the current instruction, and
   determine a smallest estimate VA access stride based on a comparison between the load VA access stride and a past VA access stride.

2. The system of claim 1, wherein the out-of-order stride prefetch unit is further configured to examine directions of past VA accesses in order to generate the smallest estimate VA access stride of the executed PC.

3. The system of claim 2, wherein the out-of-order stride prefetch unit is further configured to use the smallest estimate VA access stride in order to generate predicted future VA accesses.

4. The system of claim 3, wherein the out-of-order stride prefetch unit is further configured to prefetch the predicted future VA accesses into the cache.

5. The system of claim 2, wherein the out-of-order stride prefetch unit is further configured to track the past VA accesses in a constant direction of the executed PC.

6. The system of claim 2, wherein the out-of-order stride prefetch unit is further configured to store the smallest estimate VA access stride as the past VA access stride.

7. The system of claim 1, wherein the cache is from a plurality of caches of multi-levels.

8. The system of claim 1, further comprising:
a stream prefetch unit coupled to the processor, wherein the stream prefetch unit is configured to issue prefetches for stream access patterns.

9. The system of claim 1, wherein the out-of-order prefetch unit matches a multiple of the load VA access stride with the past VA access stride or a multiple of the past VA access stride with the load VA access stride to determine the smallest estimate VA access stride.

10. A method, comprising:
executing, with a processor in an out-of-order central processing unit (CPU), program code (PC) comprising a current instruction;
generating a load virtual address (VA) access stride, with an out-of-order stride prefetch unit coupled to the processor, using an offset between a past VA access and a current VA access, wherein the current VA access is retrieved from the current instruction; and
determining a smallest estimate VA access stride, with the out-of-order stride prefetch unit, based on a comparison between the load VA access stride and a past VA access stride.

11. The method of claim 10, wherein the method further comprises:
examining, with the out-of-order stride prefetch unit, directions of past VA accesses in order to generate the smallest estimate VA access stride of the executed PC.

12. The method of claim 11, wherein the method further comprises:
generating, with the out-of-order stride prefetch unit, predicted future VA accesses by using the smallest estimate VA access stride.

13. The method of claim 12, wherein the method further comprises:
prefetching, with the out-of-order stride prefetch unit, the predicted future VA accesses.

14. The method of claim 11, wherein the method further comprises:
tracking, with the out-of-order stride prefetch unit, the past VA accesses in a constant direction of the executed PC.

15. The method of claim 11, wherein the method further comprises:
storing, with the out-of-order stride prefetch unit, the smallest estimate VA access stride as the past VA access stride.

16. The method of claim 10, wherein a cache from a plurality of caches of multi-levels is coupled to the processor.

17. The method claim 10, wherein the method further comprises:
providing a stream prefetch unit coupled to the processor; and
issuing prefetches, with the stream prefetch unit, for stream access patterns.

18. The method of claim 10, wherein the out-of-order stride prefetch unit matches a multiple of the load VA access stride with the past VA access stride or a multiple of the past VA access stride with the load VA access stride to determine the smallest estimate VA access stride.

19. A method for improving performance of a stride-based prefetcher on an out-of-order central processing unit (CPU), the method comprising:
a.) loading a virtual address (Ld VA) from a CPU program code (PC) instruction;
b.) determining whether there is an entry for the PC in a Stride Queue (StrideQ) table;
c.) if there is no entry for the PC in the StrideQ table, creating an initialization StrideQ table entry for the PC, and repeating steps a.) and b.);
d.) if there is an entry for the PC in the StrideQ table, computing a load stride (Ld Stride);
e.) applying a matching algorithm using the Ld Stride and a read stride (Rd Stride);
f.) updating the StrideQ table according to the matching algorithm results;
g.) determining whether a State field in the StrideQ table is set to steady;
h.) if the State field in the StrideQ table is not set to steady, repeating steps a.), b.), c.), d.), e.), f.), and g.) until the State field in the StrideQ table is set to steady; and
i.) if the State field in the StrideQ table is set to steady, issuing a prefetch for a calculated virtual address (VA).

20. The method for improving performance of a stride-based prefetcher on an out-of-order CPU of claim 19, wherein the Rd Stride is the stride that is currently stored in the StrideQ table for the PC.

21. The method for improving performance of a stride-based prefetcher on an out-of-order CPU of claim 19, wherein the Ld Stride is computed to be equal to the Ld VA minus a read VA (Rd VA).

22. The method for improving performance of a stride-based prefetcher on an out-of-order CPU of claim 21, wherein the Rd VA is the VA that is currently stored in the StrideQ table for the PC.

23. The method for improving performance of a stride-based prefetcher on an out-of-order CPU of claim 19, wherein the prefetched VA is calculated to be equal to a read VA (Rd VA) plus the Rd Stride.

24. The method for improving performance of a stride-based prefetcher on an out-of-order CPU of claim 19, wherein the State field in the StrideQ table is set to steady if the matching algorithm finds a load hit match when using a Rd Stride that has a corresponding State field set to one of transient, search, and steady.

25. The method for improving performance of a stride-based prefetcher on an out-of-order CPU of claim 19, wherein the State field in the StrideQ table is set to search if the matching algorithm finds a load miss match when using a Rd Stride that has a corresponding State field set to transient.

26. The method for improving performance of a stride-based prefetcher on an out-of-order CPU of claim 19, wherein the State field in the StrideQ table is set to transient if the matching algorithm finds a load miss match when using a Rd Stride that has a corresponding State field set to steady.

* * * * *

UNITED STATES PATENT AND TRADEMARK OFFICE
CERTIFICATE OF CORRECTION

| | | |
|---|---|---|
| PATENT NO. | : 8,949,522 B1 | Page 1 of 1 |
| APPLICATION NO. | : 13/165736 | |
| DATED | : February 3, 2015 | |
| INVENTOR(S) | : Garg et al. | |

It is certified that error appears in the above-identified patent and that said Letters Patent is hereby corrected as shown below:

Title Page, Item (54) and in the Specification, Column 1, lines 2-3, Title, please replace "OUT-OF-ORDER PROCESSING" with --OUT-OF-ORDER CENTRAL PROCESSING--.

Signed and Sealed this
Nineteenth Day of May, 2015

Michelle K. Lee
*Director of the United States Patent and Trademark Office*